US007690988B2

(12) United States Patent
Kaido et al.

(10) Patent No.: US 7,690,988 B2
(45) Date of Patent: Apr. 6, 2010

(54) INFORMATION PROCESSING METHOD

(75) Inventors: Kenji Kaido, Kanagawa (JP); Tamichi Otsu, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 946 days.

(21) Appl. No.: 10/965,036

(22) Filed: Oct. 14, 2004

(65) Prior Publication Data

US 2005/0079914 A1    Apr. 14, 2005

Related U.S. Application Data

(63) Continuation of application No. 10/036,100, filed on Nov. 7, 2001, now abandoned.

(30) Foreign Application Priority Data

Nov. 21, 2000 (JP) ............................. 2000-354868
Jul. 2, 2001 (JP) ............................. 2001-201026

(51) Int. Cl.
A63F 13/00    (2006.01)
(52) U.S. Cl. .................... 463/23; 463/2; 463/7; 463/30
(58) Field of Classification Search .................. 463/43, 463/23
See application file for complete search history.

(56) References Cited

U.S. PATENT DOCUMENTS

| 5,649,862 | A | * | 7/1997 | Sakaguchi et al. ............. 463/44 |
| 6,159,100 | A | * | 12/2000 | Smith .......................... 463/42 |
| 6,266,053 | B1 | | 7/2001 | French et al. |
| 6,283,854 | B1 | * | 9/2001 | Niwa .............................. 463/7 |
| 6,322,448 | B1 | | 11/2001 | Kaku et al. |
| 6,354,940 | B1 | * | 3/2002 | Itou et al. ....................... 463/8 |
| 6,439,998 | B1 | * | 8/2002 | Itou ............................ 463/43 |
| RE37,948 | E | * | 12/2002 | Sakaguchi et al. ............. 463/43 |
| 6,585,599 | B1 | * | 7/2003 | Horigami et al. .............. 463/43 |

FOREIGN PATENT DOCUMENTS

| JP | 11-300046 | | 11/1999 |
| JP | 2000-132705 | | 5/2000 |
| JP | 2000132705 A | * | 5/2000 |
| JP | 2000-296267 | | 8/2002 |
| WO | 97-46295 | | 12/1997 |
| WO | 99/52080 | | 10/1999 |

OTHER PUBLICATIONS

Arkanoid Instruction Manual, Romstar Inc. 1986 XP002259720 p. 5.
European Search Report, May 21, 2004.
"Final Fantasy VIII Ultimania" by ICUBE, Inc. Mar. 31, 1999, p. 98-99.

* cited by examiner

Primary Examiner—John M Hotaling, II
Assistant Examiner—Jeffrey Wong
(74) Attorney, Agent, or Firm—Katten Muchin Rosenman LLP

(57) ABSTRACT

A method is disclosed for controlling a character object in a virtual space by means of an information processing program. When a specific event occurs in the execution of the information processing program, a passing rate of time of the character object in the virtual space is changed, for example, by changing the rate at which the object is displaced in the virtual space as compared to a rate of change prior to the specific event. This method can be used, for example, to decrease a rate of displacement of only the object in the virtual space so that the object may be more easily manipulated.

27 Claims, 6 Drawing Sheets

INFORMATION PROCESSING METHOD

The present application is a continuation of U.S. patent application Ser. No. 10/036,100 which was filed on Nov. 7, 2001 now abandoned, and is related to Japanese Patent Application No. 2000-354868 filed on Nov. 21, 2000, and No. 2001-201026 filed on Jul. 2, 2001, based on which this application claims priority under the Paris Convention and the contents of which are incorporated herein by reference.

BACKGROUND OF THE INVENTION

1. Field of the Invention

The present invention relates to an information processing method and a program execution device, an information processing program to be executed by a computer, and a recording medium on which an information processing program to be executed by a computer is recorded, all of which are suitable for a video game machine which operates, for example, a character in a virtual space.

2. Description of the Related Art

Conventional video games include a game such as a-called action game or sport game in which a game player (referred to as a player hereinafter) operates a character in a game virtual space displayed on a television monitor screen by using a predetermined operation terminal (referred to as a controller hereinafter). In such a video game, a player operates a plurality of buttons, a joystick, or the like formed on the controller to control the moving direction or the action of the character in the virtual space.

In a conventional video game in which the character or the like is operated, in order to make it possible that the player operates an event occurring in the virtual space for a very short period of time, for example, the passing of time in the virtual space is made slow, i.e., a so-called slow state, a frame feed state, and a stop motion state (all the states will be referred to as a slow state or the like hereinafter) are set.

However, in the slow state or the like in a conventional video game, the passing of time in the entire virtual space is slow, which raises a problem in that game properties themselves are deteriorated when the game is a video game such as an action game or a sport game in which a player receives a feeling of speed.

In addition, in the conventional video game, when the normal progress state of the game is shifted to the slow state or the like, the passing of time in the entire virtual space is sharply changed from the passing of time in the normal progress state of the game to the passing of time in the slow state or the like. For this reason, a player has a sense of incongruity, and hesitates to operate the game.

SUMMARY OF THE INVENTION

The present invention has been made in consideration of the above problems, and has as its object to provide an information processing method and a program execution device, an information processing program to be executed by a computer, and a recording medium on which an information processing program to be executed by a computer is recorded, all of which not only make them possible to operate an event occurring in a virtual space for a very short period of time but also realize the good game properties, and give a player a fresh feeling of game.

According to one aspect of the present invention, when a specific event occurs in the execution of a predetermined information processing program, a passing rate of time on a virtual space structured by the predetermined information processing program is partially changed.

According to another aspect of the present invention, when a specific event occurs in the execution of a predetermined information processing program, a passing rate of time on a virtual space structured by the predetermined information processing program is partially changed to make it possible to operate an event in the virtual space for a very short period of time, better entertainment properties can be realized to give a user a sense of entertainment which is fresh for the user.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED EMBODIMENTS

Figure 1:
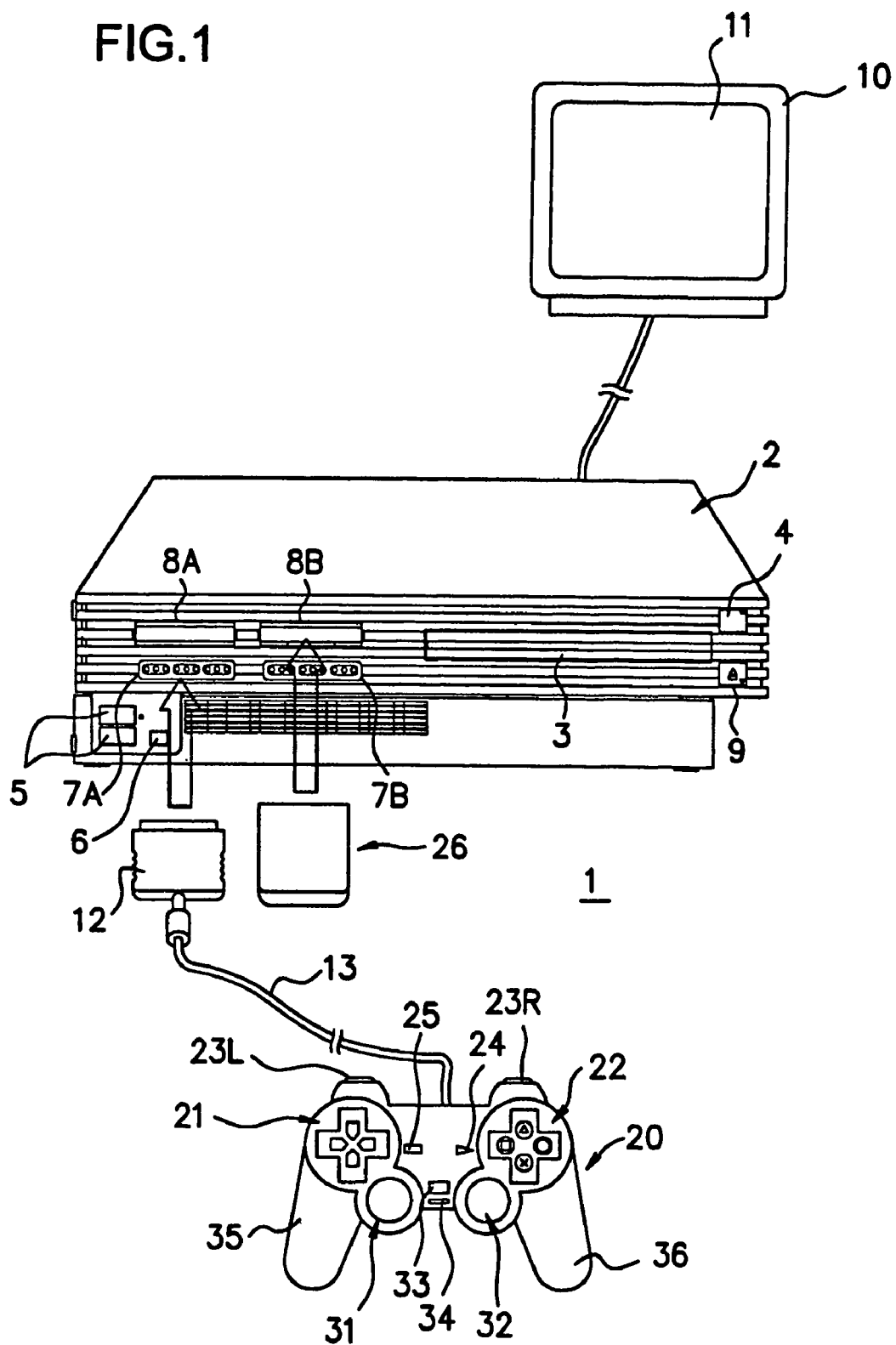
FIG. 1 is a schematic view showing a configuration of an entertainment system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

General Configuration of System of an Embodiment

FIG. 1 shows a rough configuration of an entertainment system (for example, a video game system) according to one embodiment of the present invention.

An entertainment system 1 shown in FIG. 1 is a video game system comprising an entertainment device 2 serving as an example of a program execution device according to the present invention, a controller 20 serving as an operation terminal operated by a user (player), and a television monitor device 10 for displaying the contents of a game and outputting sound in the game.

Outline of Entertainment Device

The entertainment device 2 is provided with memory card slots 8A and 8B allowing a memory card 26 to be inserted therein and ejected therefrom, controller ports 7A and 7B allowing a connector 12 of a cable 13 of the controller 20 to be attached thereto or detached therefrom, a disk tray 3 on which an optical disk such as a DVD-ROM or a CD-ROM is loaded, an open/close button 9 for opening/closing the disk tray 3, an on/standby/reset button 4 for setting an ON, standby, or reset state of a power supply, an IEEE (Institute of Electrical and Electronics Engineers) 1394 connection terminal 6, a USB (Universal Serial Bus) connection terminal 5, and the like. Although not shown, on the rear space side of the entertainment device 2, a power supply switch, an audio/video output terminal (AV multiple output terminal), a PC card slot, an optical digital output terminal, an AC power supply input terminal, and the like are provided.

The entertainment device 2 executes a game according to a game application program read from the optical disk such as a CD-ROM or a DVD-ROM, a semiconductor memory, or the like, a game application program downloaded through various communication lines such as a telephone line, a LAN, a CATV line, and a communication satellite line, and an instruction input from a player through the controller 20. The execution of the game is that the game progresses such that a video image (game video image) in a game screen displayed on a screen 11 of the television monitor device 10 connected to the entertainment device 2 or sound (game sound) of an audio device are controlled according to an instruction input by the player through the controller 20. In the entertainment device 2 shown in FIG. 1, two controllers 20 can be connected to the controller ports 7A and 7B. Using the two controllers 20 enables two players to perform various games. In the memory card 26 loaded on the memory card slot 8A or 8B, various game data generated by execution of, for example, a video game are stored (saved).

The entertainment device 2 not only executes a video game on the basis of the game application program but also can reproduce (decode) audio data recorded on a CD or video and audio data recorded on the DVD and can be operated on the basis of other various application programs.

Outline of Controller

The controller 20 has a left grip section 35 which is gripped by an operator (player) of the controller 20 such that the left grip section 35 is folded in the left palm of the player, a right grip section 36 which is gripped by the player such that the right grip section 36 is folded in the right palm of the player, a left operation section 21 and a right operation section 22 which are operated by the thumbs of the left and right hands while the grip sections 35 and 36 being gripped by left and right hands, a left analog operation section 31 and a right analog operation section 32 which are possible to perform analog operation (joystick operation) as well as by the thumbs of the left and right hands, a first left depression button 23L and a first right depression button 23R which are depressed by the left and right first fingers, and a second left depression button and a second right depression button (not shown) which are depressed by the left and right second fingers. On the left operation section 21, for example, "up", "down", "left", and "right" buttons used when the player performs an operation for moving, for example, a game character up, down, left, right, and the like on a screen are arranged. On the right operation section 22, four instruction buttons (".", ".", "x", and "." buttons) to which different functions such as setting and execution of a function of a game character are allocated by a game application are arranged. In particular, in this embodiment, a menu selection button, a title display button, a cancel or stop button, and a determination button are allocated to the "." button, the "." button, the "x" button, and "." button, respectively.

In addition, the controller 20 further comprises a mode selection switch 33 for activating or inactivating the functions of the left and right operation sections 21 and 22 and the left and right analog operation sections 31 and 32, a light display setion 34 for allowing a player to recognize a selected operation mode by displaying an illumination such as an LED (light-emitting diode), a start button 24 for instructing the entertainment device to perform reproduction and temporary stop, a select button 25 for instructing the entertainment device to display a menu and an operation panel on the monitor screen 11, and the like.

When the various buttons and operation sections are operated, the controller 20 generates operation signals corresponding to the operations and transmits the operation signals to the entertainment device 2 through the cable 13.

In the controller 20, a vibration generation mechanism for generating vibration by rotating weights which are eccentric to the rotation shafts of motors by the motors is arranged in the left and right grip sections 35 and 36. The vibration generation mechanism can be operated depending on an instruction from the entertainment device 2. More specifically, when the vibration generation mechanism is operated, a function for transmitting vibration to the players hands is achieved.

Internal Configuration of Entertainment Device

Figure 2:
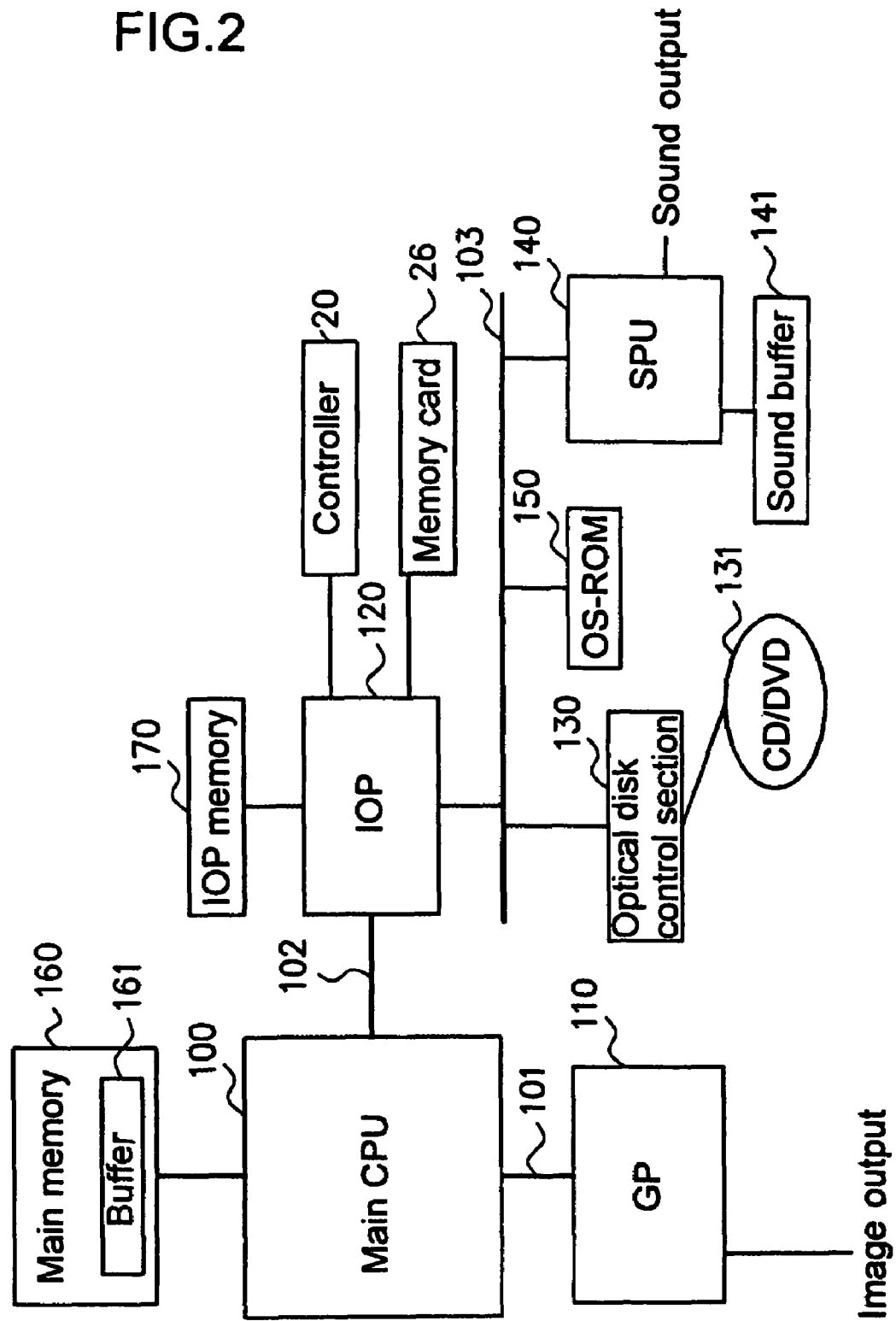
FIG. 2 is a schematic block diagram showing an internal configuration of an entertainment device according to this embodiment.

The outline of the internal circuit configuration of the entertainment device 2 according to this embodiment will be described below with reference to FIG. 2.

The entertainment device 2 according to this embodiment comprises, as basic configurations, a main CPU 100 for performing signal processing and control of internal constituent elements on the basis of various programs of a game application program or the like according to this embodiment (to be described later), a graphic processor (GP) 110 for performing image processing, an I/O processor (IOP) 120 for performing interface processing between the outside and the inside of the device, an optical disk control section 130 for performing read control of an optical disk 131 such as the DVD or the CD on which the application program or multimedia data is recorded and for decoding the read data, a main memory 160 including a buffer 161 fotemporarily storing data read from a work area of the main CPU 40 and the optical disk 131, an IOP memory 170 for storing an instruction or data executed by the I/O processor 120, an OS-ROM 150 for storing an operating system program mainly executed by the main CPU 100 or the I/O processor 120, and a sound processor unit (SPU) 140 for performing audio signal processing.

The main CPU 100 and the graphic processor 110 are connected to a dedicated bus 101. The main CPU 100 and the I/O processor 120 are connected to each other by an SBUS 102. The I/O processor 120, the optical disk control section 130, the OS-ROM 150, and the sound processor unit 140 are connected to each other by an SSBUS 103.

The main CPU 100 executes various programs or the like including the operating system program stored in the OS-ROM 150 and the game application program according to this embodiment read from the optical disk control section 130 and loaded on the main memory 160 or downloaded through a communication network to control all operations of the entertainment device. The I/O processor 120 controls inputting/outputting data from the memory card 26 for storing the settings or the like of a signal and a game from the controller 20 to which an instruction of the player is input and inputting/outputting data in a USB connection terminal, an IEEE1394 connection terminal, a PC card slot, and the like, and performs conversion or the like of data protocols.

The graphic processor 110 draws an image according to a drawing instruction from the main CPU 100 to store the drawn image in a frame buffer (not shown). The graphic processor 110 has the same function as that of a geometric transfer engine for performing a process such as coordinate transformation. The geometric transfer engine constitutes a virtual three-dimensional object by groups of triangular polygons when an application program such as a game recorded on the optical disk 131 uses so-called three-dimensional graphics. Various calculations for generating an image obtained by photographing the three-dimensional object by a virtual camera is performed, i.e., transparent transformation when rendering is performed (calculations of coordinate values when the vertexes of respective polygons constituting the three-dimensional object are projected on a virtual camera screen) is performed. The graphic processor 110 performs rendering of the three-dimensional object to the frame buffer according to a drawing instruction from the main CPU 100 while using the geometric transfer engine as needed to form an image. The graphic processor 110 outputs a video signal representing the formed image.

The sound processor unit 140 comprises an ADPCM decoding function for reproducing audio data subjected to adaptive predictive coding, a reproducing function for reproducing an audio signal such as sound effects by reproducing waveform data stored in a sound buffer 141 to output the audio signal, a modulation function for modulating and reproducing the waveform data stored in the sound buffer 141. Since the sound processor unit 140 comprises these functions, the sound processor unit 140 is designed to be used as a so-called sampling sound source which generates an audio signal such as music or sound effects from the waveform data stored in the sound buffer 141 on the basis of an instruction from the main CPU 100.

In the entertainment device 2 having the above configuration, when a power supply is turned on, the operating system program for the main CPU and the operating system program for the I/O processor are read from the OS-ROM 150, and the operating system programs are executed by the main CPU 100 and the I/O processor 120, respectively. In this manner, the main CPU 100 integrally controls the respective sections of the entertainment device 2. The I/O processor 120 controls inputting/outputting a signal between the I/O processor 120 and the controller 20 or the memory card 26. When the main CPU 100 executes the operating system program, the main CPU 100 performs an initializing process such as an operation check, controls the optical disk control section 130, reads the application program such as a game recorded on the optical disk 131, loads the application program on the main memory 160, and execute the game application program. When the game application program is executed, the main CPU 100 controls the graphic processor unit 110 and the sound processor unit 140 according to an instruction of a player received from the controller 20 through the I/O processor 120 and controls a display of an image and generation of sound effects and music.

Rough Configuration of Game Application Program

In the entertainment device 2 described above, a video game realized by the game application program of this embodiment will be described below. The video game in this embodiment is not limited to the types of games such as a so-called roll playing game (RPG), an adventure game (AVG), and a simulation game (SLG).

Figure 3:
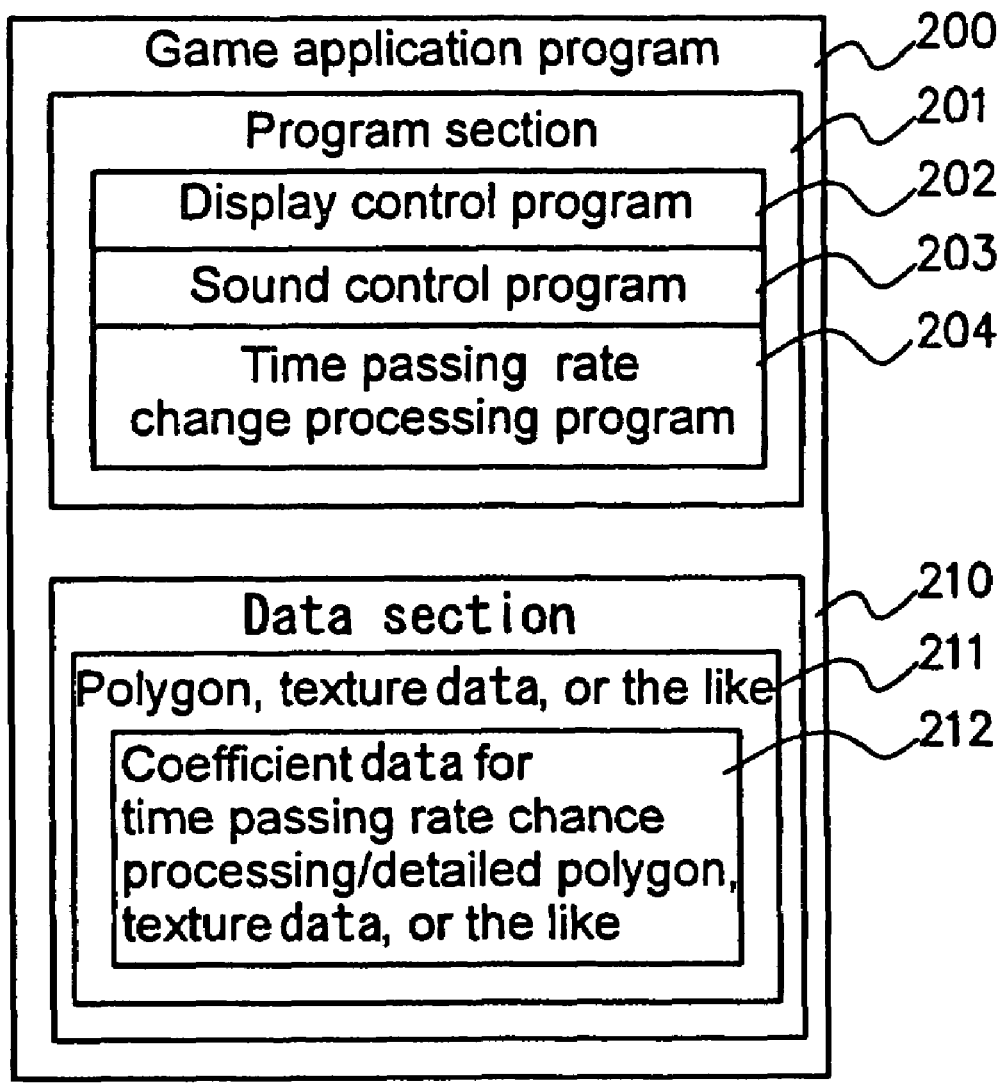
FIG. 3 is a diagram used for explaining the data configuration of a game application program according to this embodiment.

The game application program of this embodiment can be recorded on a recording medium such as the optical disk 131 and can be downloaded through a communication line, and has a data configuration shown in FIG. 3, for example. The data configuration shown in FIG. 3 conceptually represents a program section and other data sections included in the game application program, and does not represent an actual program configuration.

As shown in FIG. 3, a game application program 200 according to this embodiment is roughly constituted by a program section 201 executed by the main CPU 100 and various data sections 210 for generating polygons and textures used when a video game image is generated.

The program section 201 includes at least a display control program 202 for controlling a game virtual space displayed on the screen 11, an object display in the virtual space, and the like, a sound control program 203 for controlling sound generation or the like in the execution of the game, and a program 204 for realizing a time passing rate change processing (to be described later) according to this embodiment.

The data sections 210 includes data 211 for generating polygons and textures when a video game image is generated and data 212 for the time passing rate change processing according to this embodiment. Although the details will be described later, the data for the time passing rate change processing is, for example, coefficient data to be multiplied to a variable for determining the position for every unit time of objects in the virtual space, detailed polygon data and texture data for generating detailed polygons and textures used when only a specific portion of the object in, for example, the virtual space can be controlled by magnifying and displaying the specific portion as the time passing rate change process, and the like.

Outline of Time Passing Rate Change Processing Program

A time passing rate change processing program according to this embodiment is a program for realizing an operation performed by a player with respect to an even occurring in a virtual space for a very short period of time. For example, when a specific event occurs in the progress of the game (when a specific condition is satisfied), the time passing rate change processing program partially changes (for example, delays) a time passing rate in the virtual space and, at the same time, changes operation methods themselves to a character, so that different game properties and different feelings of game can be given to the player on a continuous screen of the game.

As the "occurrence of a specific event", for example, a case in which a certain scene is changed to a predetermined scene on a virtual space of a video game, a case in which another object or the like is close to a predetermined object or the like within a predetermined distance, a case in which a game character is moved to an area on a specific map, a case in which the progress of the game reaches a predetermined state such as a case in which it is predetermined time in the progress of the game, a case in which a predetermined button arranged on the controller is pressed, a case in which a predetermined instruction is made by the controller such as a case in which a predetermined button arranged on the controller is continuously hit, and the like are exemplified.

Figure 4:
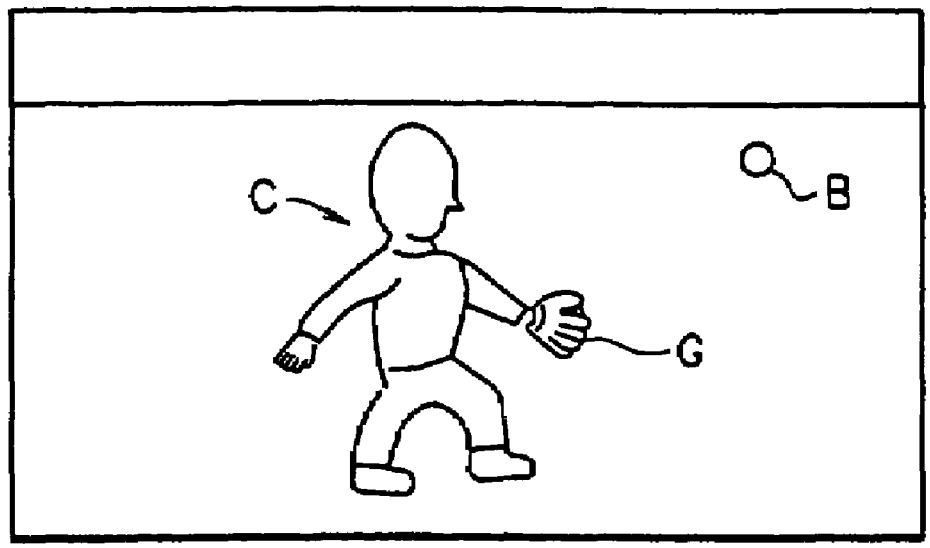
FIG. 4 is a diagram showing a scene in which a ball flies to a game character as one scene of a video game.
Figure 5:
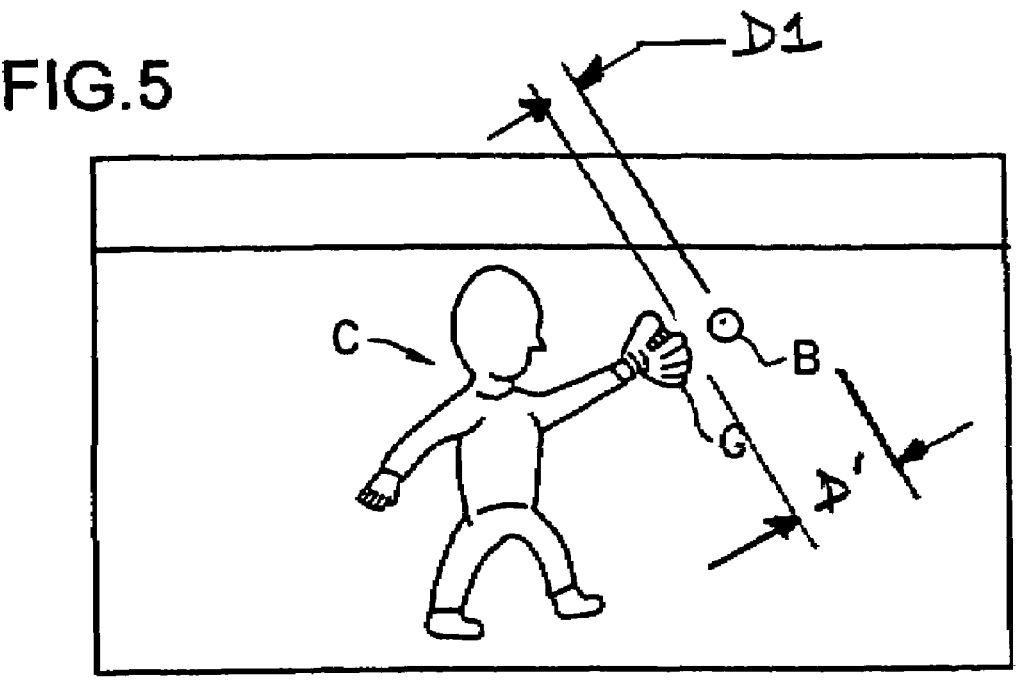
FIG. 5 is a diagram showing a scene in which a game character will catch a ball as one scene of a video game.

As an example of the "occurrence of a specific event", for example, "another object is close to a predetermined object within a predetermined distance" includes the following cases. In FIG. 4, a scene is presented in which a ball B (another object) moves toward a game character C (the predetermined object). In FIG. 5, the character C stretches her/his hand to catch the ball B with a glove G, the ball B comes into the screen, such that the distance D1 between the ball B and the glove G is smaller than the predetermined distance D', and the like.

The specific events (specific conditions) are set for respective video game applications in advance. In addition, in one video game, specific events can be set as different conditions depending on a certain scene, a progress state of the game, and the like.

The "the passing rate of time in a virtual space is partially changed" means that a rate of displacement of the predetermined object over successive frames in a world coordinate system is changed by multiplying a predetermined coefficient to a variable for determining the position in each successive frame of predetermined object in the virtual space, while a moving speed of a viewpoint in the virtual space (i.e., moving speed of a camera which virtually photographs the game space) and an input acceptance frequency from the controller 20 are not changed. In other words, only a time passing rate of the predetermined object is changed (for example, decreased or increased) with respect to the time passing rate of the virtual space. The coefficient can also be increased or decreased for each object. In this manner, the game properties can be variably changed.

For example, with reference to FIG. 5, when the distance D1 between ball B and glove G becomes less than the predetermined distance D', the predetermined coefficient is set so that the displacement of the glove G and the rate of displacement of the ball B are manipulated to slow such that the passing rate of time is effectively diminished, thereby making it easier for example for the player to manipulate glove G of character C to catch ball B.

As described above, according to the time passing rate change processing program of this embodiment, "the passing rate of time in a virtual space is partially changed", and, on the other hand, the moving speed of the viewpoint in the virtual space and an input acceptance frequency from the controller are not changed, to thereby, for example, enable the player to control with the controller 20 a motion of the character which is almost impossible in general in a continuous game.

More specifically, when the passing rate of time of a predetermined object in the virtual space is, for example, decreased, the player can know a motion of a character or the like occurring in the virtual space for a very short period of time. When the moving speed of the view point in the virtual space and the input acceptance frequency from the controller are not changed, the player can operate a motion of the character which is almost impossible in general without a sense of incongruity. In other words, in order to make a player to recognize a motion of the character occurring in the virtual space for a very short period of time, for example, as the slow state and the like in the prior art, when time in the entire virtual space including the viewpoint is delayed, the player is perplexed by a sharp change in time in the virtual space. In addition, in order to make it possible that a motion of the character occurring in a virtual space for a very short period of time is operated by the controller, for example, when an input acceptance frequency from the controller is increased, the player cannot cope with the change of the input acceptance frequency of the controller to be hard to operate the game. However, in this embodiment, these drawbacks do not occur.

In this embodiment, since a time passing rate in the virtual space is not changed, sound generation is normally performed, and sound at a normal speed is output.

In this embodiment, for the sake of descriptive convenience, as an example the time passing rate of which is changed, the object is used, however, the present invention is not limited to the object, for example, the time passing rates of all things included in a predetermined range in the virtual space can be changed.

The "operation methods themselves to the character are changed" is that, when a movement of the entire body of the character is generally operated by the controller 20 (for example, analog operation sections 31 and 32), and the specific event occurs (the specific condition is satisfied), the methods are switched to each other such that only a specific part such as a hand of the character is operated by the controller 20 (for example, the analog operation sections 31 and 32).

Figure 6:
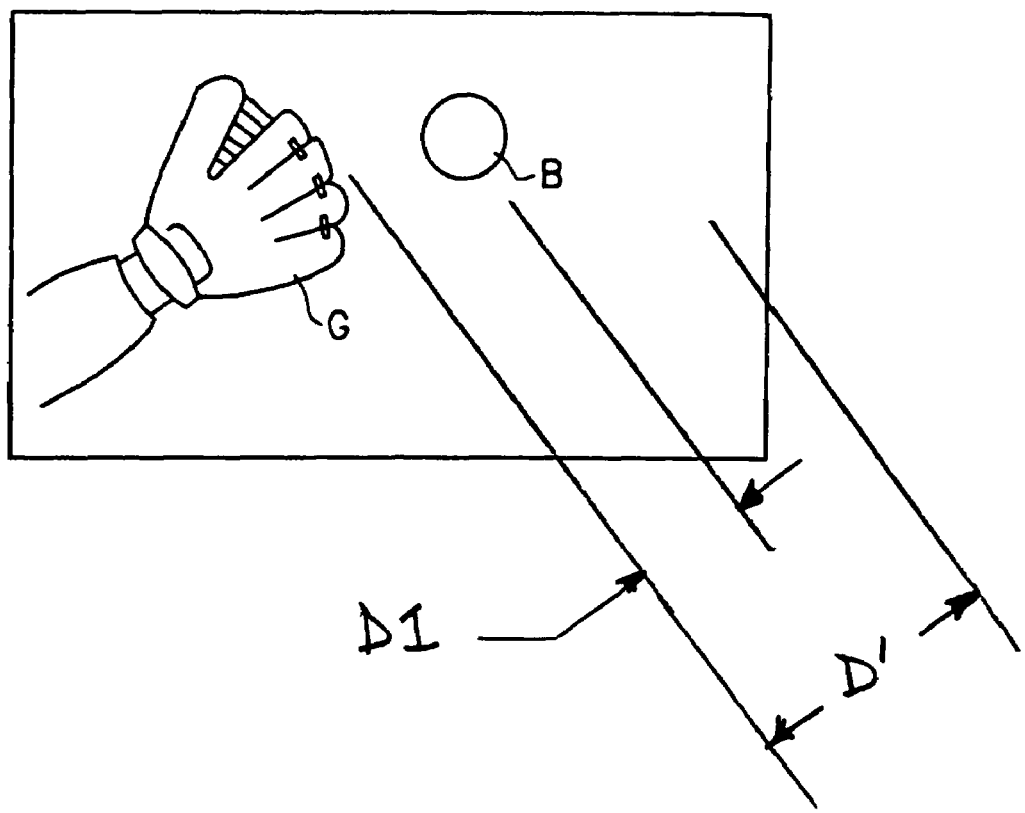
FIG. 6 is a diagram showing one scene of a video game used for explaining a concrete example in which the game properties are changed by execution of a time passing rate change processing program according to this embodiment.

More specifically, for example, in the case of FIG. 4 or 5, the movement or the like of the entire body of a game character C is operated by the controller 20, however, after a specific event occurs such that the distance D1 between the ball B and the glove G is smaller than the predetermined distance D', as shown in FIG. 6, the methods are switched such that only a hand (motion of the glove G) of the character C is operated by the controller 20. In this manner, for example, the ball B which moves at a high speed can be caught by the hand (glove G) of the character C, which for example moves at a slower speed as earlier described with reference to FIG. 5. In this case, as in the case in FIG. 6, when a viewpoint position or a field angle (i.e., the position or the angle of view of a camera which virtually photographs the game space) in the virtual space is changed, for example, when a zoom-in operation is performed, a further direction effect can be obtained in the game properties.

In a conventional technique, when the zoom-in method is employed, the player is merely confused. In this embodiment, the passing rate of time of only a part in the virtual space is changed (for example, the passing rate of time for the glove G of the character C and the passing rate of time for ball B are decreased), and moving speed of a viewpoint in the virtual space is not changed. For this reason, the player can cope with the game with a margin without a sense of incongruity.

As described above, according to the time passing rate change processing program of this embodiment, when "the operation methods themselves to the character are changed", the player can enjoy an event occurring in the virtual space for the very short period of time, and the game properties can be changed.

Flow of Processes in Execution of Time Passing Rate Change Processing Program

Figure 7:
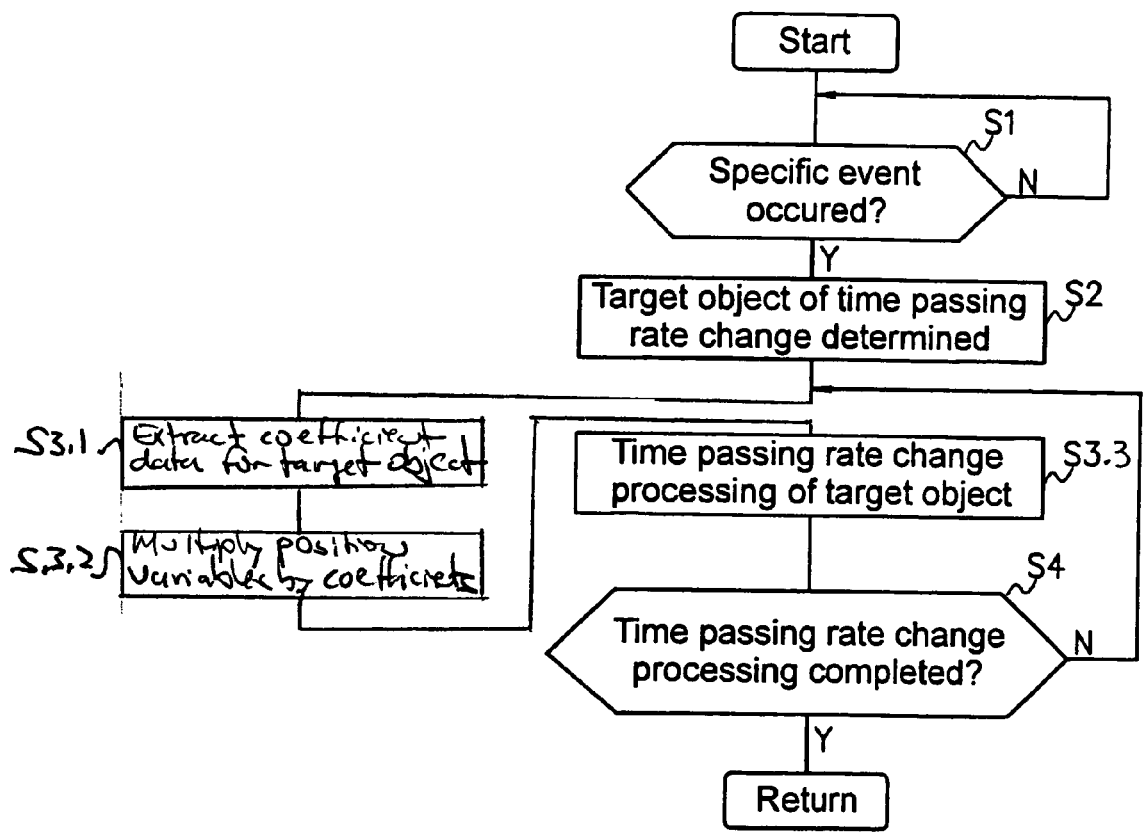
FIG. 7 is a flow chart showing a flow of rough processes in the execution of the time passing rate change processing program according to this embodiment.

FIG. 7 shows the flow of rough processes in the execution of the time passing rate change processing program included in the game application program according to this embodiment described above. The flow of the time passing rate change processes (to be described later) is realized such that the time passing rate change processing program included in the game application program of this embodiment is operated on the main CPU 100 built in the entertainment device 2 shown in FIG. 1.

In FIG. 7, the time passing rate change processing program determines whether the specific event occurs or not (the specific condition is satisfied or not) as the process in step S1 in the progress of the video game. More specifically, the main CPU 100 monitors that the progress of the video game reaches a predetermined state or that a predetermined instruction is performed from the controller 20 on the basis of the time passing rate change processing program 204 of this embodiment shown in FIG. 3 and loaded on the main memory 160 to determine whether the specific event occurs or not.

When the specific event occurs in the step S1, the time passing rate change processing program determines an object serving as a target to be subjected to the time passing rate change processing as the process in step S2. More specifically, the main CPU 100 determines a target object or the like to be subjected to the time passing rate change processing in the virtual space on the basis of a progress state of the video game or an instruction from the controller 20.

The time passing rate change processing program performs the time passing rate change processing for the target object as the process in steps S3.1-S3.3. More specifically, the main CPU 100 extracts coefficient data for the target object in step S3.1, multiplies variables for determining the position by the coefficient data for every unit time of the target object from the data 212 for the time passing rate change processing loaded on the main memory 160 and shown in FIG. 3, and performs time passing rate change processing for the target object in step S.3. In step S 3.2, the variables for determining the position for every unit time of the target object are multiplied by the coefficient data to change the time passing rate of the target object in the virtual space. If necessary, an operation input of the controller 20 for the character constituted by the target object may in addition be changed to change operation methods for the character.

As in the example shown in FIG. 6, when only a specific part of the character is zoomed in to obtain an enlarged image and to make it possible to control the specific part, the main CPU 100 extracts detailed polygons and texture data for displaying the specific part of the character from the data 212 for the time passing rate change processing in FIG. 3. In this manner, in the graphic processor 110, an enlarged image of the specific part of the character is generated from the detailed polygons and texture data.

The time passing rate change processing program determines whether the time passing rate change processing for the target object is completed or not as the process in step S4. If the time passing rate change processing is not completed, the flow returns to the process in step S3. If the time passing rate change processing is completed, the flow returns to the normal game process in the game application program. More specifically, when the control is out of the specific event by the progress of the video game, an operation input from the controller 20, or the like, the main CPU 100 returns the control to the normal progress of the game.

Conclusion of Embodiment

As has been described above, according to this embodiment, since the time passing rate of the predetermined object in the virtual space can be changed into another rate different from the time passing rate in the virtual space, the predetermined object can be controlled by the different manner as that of another part in the virtual space. In addition, according to this embodiment, since a viewpoint moving speed in the virtual space and an acceptance frequency of a predetermined instruction input are not changed, the continuity of predetermined information processing viewed from a user is not deteriorated.

More specifically, according to this embodiment, in a video game which operates, for example, a character in the virtual space, when a specific event occurs in the progress of the game, the time passing rate of a target object in the virtual space is changed, and operation methods themselves to the character or the like are changed. For this reason, an event occurring in the virtual space for a very short period of time can be operated by the player, and different game properties on continuous screens in the game is realized, therefore, a fresh feeling of game can be given to the player.

In particular, when the time passing rate of the object is decreased, complex detailed operation systems and game strategies which cannot be operated (or are difficult to be operated) by a player at a normal game speed can be realized without giving influence to the tempo, basic operation, and basic rule of the game. Therefore the game properties can be considerably improved, and a new-style game can be formed.

The description of the embodiment is an example of the present invention. For this reason, the present invention is not limited to the embodiment, and various changes can be effected depending on a design or the like without departing from the spirit and scope of the invention, as a matter of course. For example, the time passing speed change processing program according to the present invention can also be applied not to only a video game machine but also to all information processing devices such as personal computers which can perform processes corresponding to the program. Although the embodiment exemplifies the case in which the time passing rate of the target object is decreased, the time passing rate can be increased, and a temporary stop operation, a frame feed operation, a time reverse operation, and a time jump operation can also be performed.

What is claimed is:

1. An information processing method performed by a computer, comprising the steps of:
   constructing a virtual space including a viewpoint and a character object controlled by an operation terminal;
   determining the presence of an occurrence of an event satisfying a specific condition;
   changing a passing rate of time of the character object in the virtual space without changing an input acceptance frequency from the operation terminal, by changing a displacement of the character object among frames in a world coordinate system of the virtual space from the state in which the event does not occur;
   when the event occurs, wherein the changing of the passing rate of time of the character object is accomplished by extracting coefficient data for the character object and multiplying variables for determining a position by the extracted coefficient data for every unit time of the character object in the virtual space;
   and changing an object to be controlled by the operation terminal from the character object as a whole to a specific part of the character object, when the event occurs.

2. The information processing method according to claim 1, wherein:
   the virtual space comprises a plurality of objects including the character object in a predetermined area thereof; and
   the changing step further includes the step of changing the displacement of the respective objects.

3. The information processing method according to claim 1, further comprising the step of:
   making a viewpoint moving speed in the virtual space after the event occurs equal to a viewpoint moving speed in the virtual space before the event occurs.

4. The information processing method according to claim 1, further comprising the step of:
   making an acceptance frequency of the instruction input after the event occurs equal to an acceptance frequency of the instruction input before the event occurs, when the event in the virtual space is controlled depending on a predetermined instruction input.

5. The information processing method according to claim 1, wherein the determining step further comprises the step of:
   determining that an event satisfying the specific condition has occurred when a distance between the character object and other objects in the virtual space is within a predetermined range.

6. The information processing method according to claim 1, further comprising the step of:
  changing at least one of a viewpoint position and a field angle in the virtual space depending on the occurrence of the event.

7. A program execution device executing an information processing program, wherein the information processing program includes program code for causing the program execution device to perform the steps of:
  constructing a virtual space including a viewpoint and a character object controlled by an operation terminal;
  determining the presence of occurrence of an event satisfying a specific condition; changing a passing rate of time of the character object in the virtual space without changing an input acceptance frequency from the operation terminal, by changing a displacement of the character object among frames in a world coordinate system of the virtual space from the state in which the event does not occur, when the event occurs, wherein the changing of the passing rate of time of the character object is accomplished by extracting coefficient data for the character object, and multiplying variables for determining a position by the extracted coefficient data for every unit time of the character object in the virtual space; and
  changing an object to be controlled by the operation terminal from the character object as a whole to a specific part of the character object, when the event occurs.

8. The program execution device for executing an information processing program according to claim 7, wherein
  the virtual space comprises a plurality of objects including the character object in a predetermined area thereof; and
  the changing step includes the step of:
  changing the displacement of the respective objects.

9. The program execution device for executing an information processing program according to claim 7, wherein
  the information processing program, further including program code for causing the program execution device to perform the step of:
  making a viewpoint moving speed in the virtual space after the event occurs equal to a viewpoint moving speed in the virtual space before the event occurs.

10. The program execution device for executing an information processing program according to claim 7, wherein
  the information processing program, further including program code for causing the program execution device to perform the step of:
  making an acceptance frequency of the instruction input after the event occurs equal to an acceptance frequency of the instruction input before the event occurs, when the event in the virtual space is controlled depending on a predetermined instruction input.

11. The program execution device for executing an information processing program according to claim 7, wherein
  the determining step further includes the step of:
  determining that an event satisfying the specific condition has occurred when a distance between the character object and other objects in the virtual space is within a predetermined range.

12. The program execution device for executing an information processing program according to claim 7, wherein
  the information processing program, further including program code for causing the program execution device to perform the step of:
  changing at least one of a viewpoint position and a field angle in the virtual space depending on the occurrence of the event.

13. A computer readable recording medium on which an information processing program to be executed by a computer is recorded, wherein the information processing program includes program code for causing the program execution device to perform the steps of:
  constructing a virtual space including a viewpoint and a character object controlled by an operation terminal;
  determining the presence of occurrence of an event satisfying a specific condition; changing a passing rate of time of the character object in the virtual space without changing an input acceptance frequency from the operation terminal, by changing a displacement of the character object among frames in a world coordinate system of the virtual space from the state in which the event does not occur, when the event occurs, wherein the changing of the passing rate of time of the character object is accomplished by extracting coefficient data for the character object, and multiplying variables for determining a position by the extracted coefficient data for every unit time of the character object in the virtual space; and
  changing an object to be controlled by the operation terminal from the character object as a whole to a specific part of the character object, when the event occurs.

14. The computer readable recording medium on which an information processing program to be executed by a computer is recorded according to claim 13, wherein;
  the virtual space comprises a plurality of objects including the character object in a predetermined area thereof; and
  the change step further includes the step of:
  changing the displacement of the respective objects.

15. The computer readable recording medium on which an information processing program to be executed by a computer is recorded according to claim 13, wherein
  the information processing program, further including program code for causing the program execution device to perform the step of:
  making a viewpoint moving speed in the virtual space after the event occurs equal to a viewpoint moving speed in the virtual space before the event occurs.

16. The computer readable recording medium on which an information processing program to be executed by a computer is recorded according to claim 13, wherein
  the information processing program, further including program code for causing the program execution device to perform the step of:
  making an acceptance frequency of the instruction input after the event occurs equal to an acceptance frequency of the instruction input before the event occurs, when the event in the virtual space is controlled depending on a predetermined instruction input.

17. The computer readable recording medium on which an information processing program to be executed by a computer is recorded according to claim 13, wherein
  the determining step further includes the step of:
  determining that an event satisfying the specific condition has occurred when a distance between the character object and other objects tin the virtual space is within a predetermined range.

18. The computer readable recording medium on which an information processing program to be executed by a computer is recorded according to claim 13, wherein
  the information processing program, further including program code for causing the program execution device to perform the step of:
  changing at least one of a viewpoint position and a field angle in the virtual space depending on the occurrence of the event.

19. A computer for storing and executing an information processing program, the information processing program including program code for causing the computer to perform the steps of:
constructing a virtual space including a viewpoint and a character object controlled by an operation terminal;
determining the presence of occurrence of an event satisfying a specific condition; changing a passing rate of time of the character object in the virtual space without changing an input acceptance frequency from the operation terminal, by changing a displacement of the character object among frames in a world coordinate system of the virtual space from the state in which the event does not occur, when the event occurs, wherein the changing of the passing rate of time of the character object is accomplished by extracting coefficient data for the character object, and multiplying variables for determining a position by the extracted coefficient data for every unit time of the character object in the virtual space; and
changing an object to be controlled by the operation terminal from the character object as a whole to a specific part of the character object, when the event occurs.

20. The information processing method according to claim 1, wherein
the controllable object is limited to the specific part of the character object when the event occurs.

21. The program execution device executing an information processing program according to claim 7, wherein
the controllable object is limited to the specific part of the character object when the event occurs.

22. The computer readable recording medium on which an information processing program to be executed by computer is recorded according to claim 13, wherein
the controllable object is limited to the specific part of the character object when the event occurs.

23. The computer for storing and executing an information processing program according to claim 19, wherein
the controllable object is limited to the specific part of the character object when the event occurs.

24. The information processing method according to claim 1, wherein the changing a passing rate of time is performed without changing a moving speed of the viewpoint in the virtual space.

25. The program execution device according to claim 7, wherein the changing a passing rate of time is performed without changing a moving speed of the viewpoint in the virtual space.

26. The computer readable recording medium according to claim 13, wherein the changing a passing rate of time is performed without changing a moving speed of the viewpoint in the virtual space.

27. The computer according to claim 19, wherein the changing a passing rate of time is performed without changing a moving speed of the viewpoint in the virtual space.

* * * * *